(12) United States Patent
Lin

(10) Patent No.: US 8,851,016 B2
(45) Date of Patent: Oct. 7, 2014

(54) BREEDING CAGE FOR EXPERIMENTAL ANIMAL

(75) Inventor: Jung Yu Lin, Taichung (TW)

(73) Assignee: Rung Shin Plastic Industrial Co., Ltd., Taichung (TW)

( * ) Notice: Subject to any disclaimer, the term of this patent is extended or adjusted under 35 U.S.C. 154(b) by 514 days.

(21) Appl. No.: 13/155,765

(22) Filed: Jun. 8, 2011

(65) Prior Publication Data
US 2012/0312245 A1    Dec. 13, 2012

(51) Int. Cl.
*A01K 1/03*    (2006.01)
(52) U.S. Cl.
USPC .......................................................... 119/417
(58) Field of Classification Search
USPC ................................................... 119/417–420
See application file for complete search history.

(56) References Cited

U.S. PATENT DOCUMENTS

| | | | | |
|---|---|---|---|---|
| 2,988,044 | A * | 6/1961 | Adelberg et al. | 119/417 |
| 4,201,153 | A * | 5/1980 | Nace | 119/224 |
| 4,593,650 | A * | 6/1986 | Lattuada | 119/419 |
| 5,000,120 | A * | 3/1991 | Coiro et al. | 119/419 |
| 5,003,922 | A * | 4/1991 | Niki et al. | 119/418 |
| 5,042,429 | A * | 8/1991 | Deitrich et al. | 119/419 |
| 6,092,487 | A * | 7/2000 | Niki et al. | 119/420 |
| 8,037,847 | B2 * | 10/2011 | Malnati et al. | 119/419 |
| 8,186,305 | B2 * | 5/2012 | Kawano | 119/420 |
| 8,522,721 | B2 * | 9/2013 | Bernardini et al. | 119/417 |
| 2006/0254528 | A1 * | 11/2006 | Malnati et al. | 119/419 |

FOREIGN PATENT DOCUMENTS

| | | |
|---|---|---|
| TW | 536381 | 6/2003 |
| TW | 369029 | 11/2009 |
| WO | 2005089536 | 9/2005 |

* cited by examiner

*Primary Examiner* — David Parsley
(74) *Attorney, Agent, or Firm* — Wang Law Firm, Inc.; Li K. Wang; Stephen Hsu

(57) ABSTRACT

A breeding cage for experimental animals is composed of a box body and a cover body covered with the box body. A side of the cover body is disposed with an air intake valve and an air vent valve. A partition is disposed in the cover body to allow an inside of the cover body to define a drainage channel. Fresh air enters from the air intake valve and is then downwardly introduced into the box body through the drainage channel and pushes air originally within the box body to exhaust it away from the air vent valve to allow air within the box body to perform circulation.

5 Claims, 8 Drawing Sheets

BREEDING CAGE FOR EXPERIMENTAL ANIMAL

BACKGROUND OF THE INVENTION

1. Field of the Invention

The present invention relates to a breeding container, and more particularly to a breeding cage for experimental animals.

2. Description of the Related Art

Taiwan patent number 536381 discloses an animal breeding container structure. Its air intake unit and an air vent unit are directly disposed to a container box, and a filtering device is additionally disposed to a cover body of the container box. However, in the animal breeding container composed of the foregoing components, the air intake and air vent units may be easily bitten to cause damages, and its closing function can be lost. Moreover, since the air intake and air vent units respectively have automatic sealing function, the foregoing function may increase production costs.

To prevent the air intake and air vent units from being easily bitten, WO patent number 2005089536 disposes air intake and air vent units on a cover body of a container box. WO patent number 2005089536 may overcome the problem of easily damaging the air intake and air vent units. However, the air intake and air vent units may achieve automatic closing effect through self-material flexibility. The closing effect may be easily incomplete due to elastic fatigue of the materials. Further, the air intake and air vent units are complicated and will increase the production cost. In addition, since the filtering device is disposed in the cover body and located at an upstream of the air vent unit, entire breeding container box will form a complete sealing space after automatically closing the air intake and air vent units. Consequently, animals bred in the container box may be stifled due to lack of oxygen.

Taiwan patent number M369029 discloses another breeding container. An air intake passage and an air vent passage are disposed to a cover body of the breeding container and respectively communicate with an air chamber. The air chamber is divided by a partition into an air intake chamber and an air vent chamber. An opening of the air chamber communicating with the breeding container is disposed with a filtering device. A sealing ring is embedded with an external edge of the filtering device. A top of the filtering device corresponding to the partition has a sealing strip, and a filter is clamped in the filtering device. However, the structural composition of embedding the sealing ring at the external edge of the filtering device to close with the air chamber and disposing the sealing strip at the top of the filtering device corresponding to the partition is still complicated. Consequently, it may not decrease the production cost that needs to be overcome.

SUMMARY OF THE INVENTION

In view of the shortcomings of the prior art, the inventor(s) of the present invention based on years of experience in the related industry to conduct extensive researches and experiments, and finally developed a breeding cage for experimental animals as a principle objective capable of introducing fresh air into a box body to exactly exhaust foul air originally within the box body away.

To achieve the foregoing objective, the breeding cage for experimental animals according to the invention is composed of a box body and a cover body. The cover body is covered with the box body. An arc portion is disposed to a rear end of the cover body. The cover body further comprises an air intake disposed to a front of the cover body and that is toward one of sides, wherein the air intake is inserted with an air intake valve; an air vent disposed to the front of the cover body and that is distant from a side of the air intake, wherein the air vent is inserted with an air vent valve; and a partition located in the cover body to extend toward the arc portion from the front of the cover body, and the partition and the cover body defining a drainage channel.

Fresh air enters the air intake valve disposed to the air intake and flows into the arc portion through the drainage channel defined by the partition and the cover body, and fresh air is then downwardly introduced in the box body through the arc portion and pushes foul air originally within the box body to exhaust it away from the air vent valve disposed to the air vent, thereby circulating air within the box body.

DETAILED DESCRIPTION OF THE PREFERRED EMBODIMENTS

The foregoing and other technical characteristics of the present invention will become apparent with the detailed description of the preferred embodiments and the illustration of the related drawings.

Figure 1:
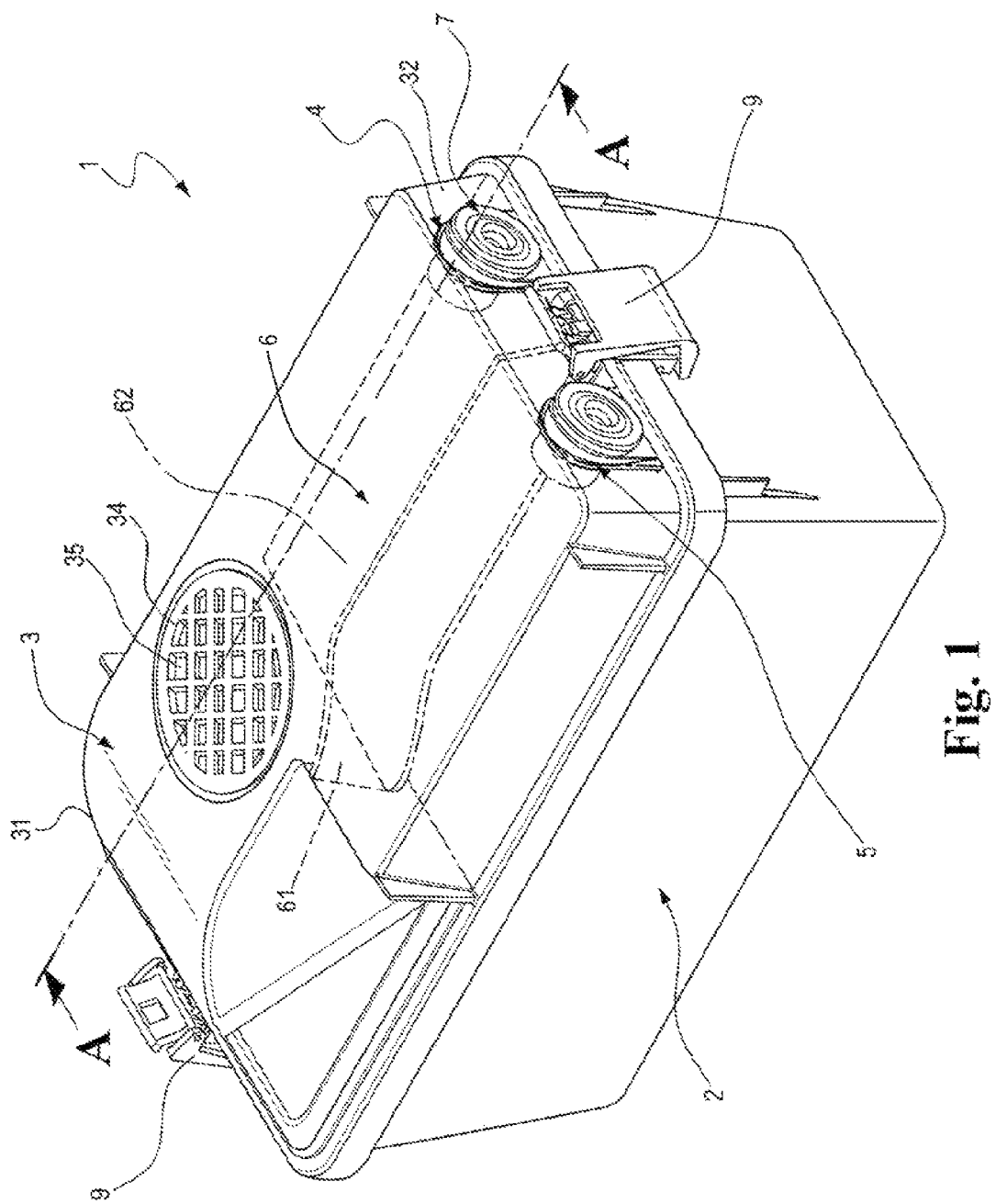
FIG. 1 is a schematic diagram of a three-dimensional appearance according to the invention.
Figure 2:
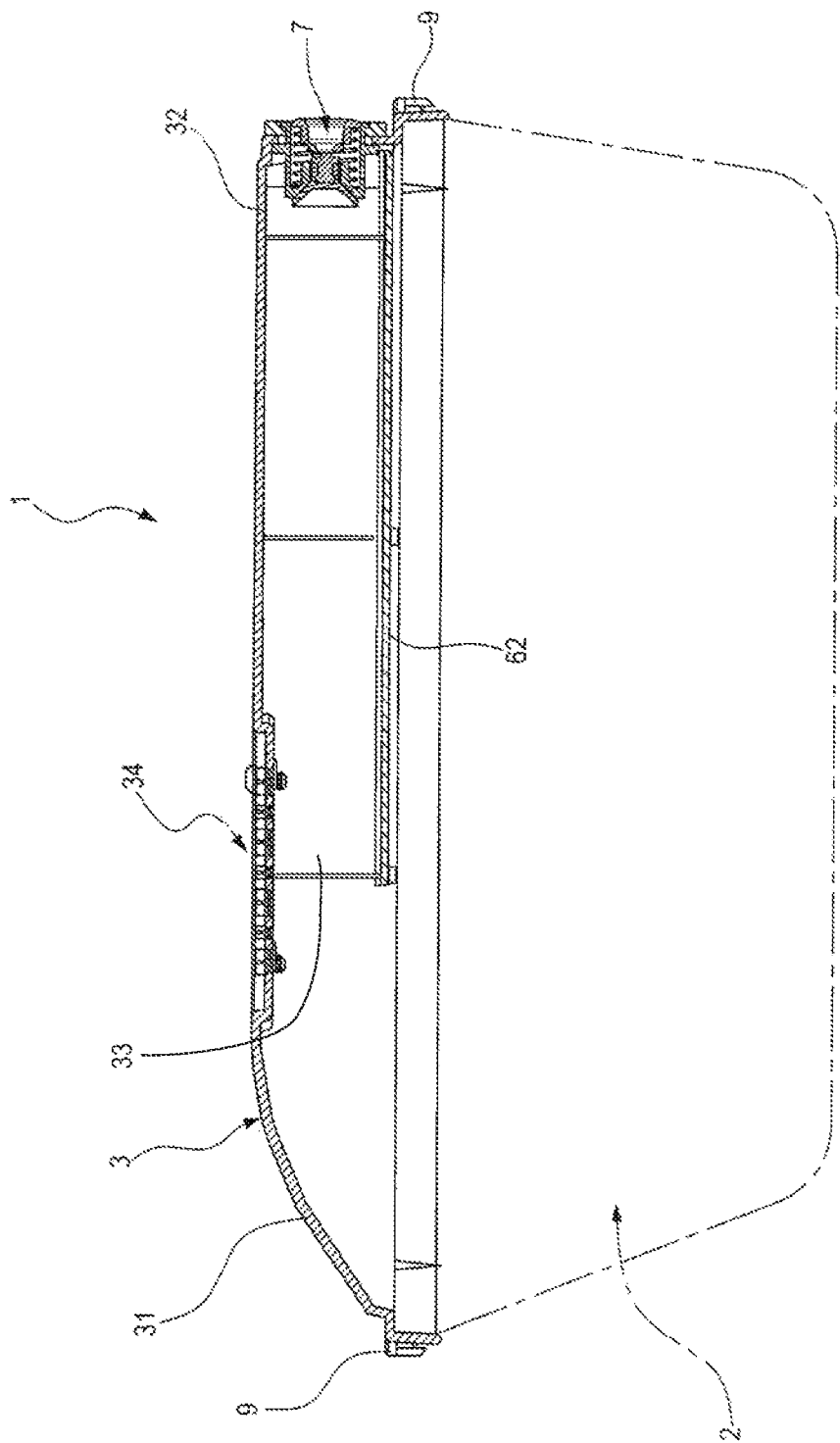
FIG. 2 is a cross-sectional drawing of an A-A cross section according to FIG. 1 of the invention.

With reference to FIG. 1 and FIG. 2, a breeding cage 1 for experimental animals of the invention comprises a box body 2 and a cover body 3. The cover body 3 is covered with the box body 2. The cover body 3 is detachably combined and fastened with the box body 2 through a buckle member 9.

An arc portion 31 is disposed to a rear end of the cover body 3, and the cover body 3 further comprises an air intake 4, an air vent 5 and a partition 6. The air intake 4 is disposed to a front end 32 of the cover body 3 and is toward a side (e.g. a right side as shown in FIG. 1), and an air intake valve 7 is inserted into the air intake 4. The air vent 5 is disposed to a front end 32 of the cover body 3 and is distant from a side of the air intake 4. An air vent valve 8 is inserted into the air vent 5. The partition 6 is composed of approximately and vertically combining a vertical plate 61 and a horizontal plate 62. The partition 6 relative to the air intake 4 and the arc portion 31 is disposed in the cover body 3, and a drainage channel 33 is defined by the partition 6 and the cover body 3. Preferably, a length of the drainage channel 33 is larger than a half of a length of the cover body 3.

Moreover, the cover body 3 has a filtering net 34 partially and rotably disposed to a place near the arc portion 31 to prevent the air intake 4, the air intake valve 7 or the air vent 5 and the air vent valve 8 from being blocked to cause the asphyxia of experimental animals. The filtering net 34 has a replaceable filter 35. The filter 35 can be selected with filters having different classes upon actual demands to achieve various requests for ventilation and filtering viruses.

Figure 4:
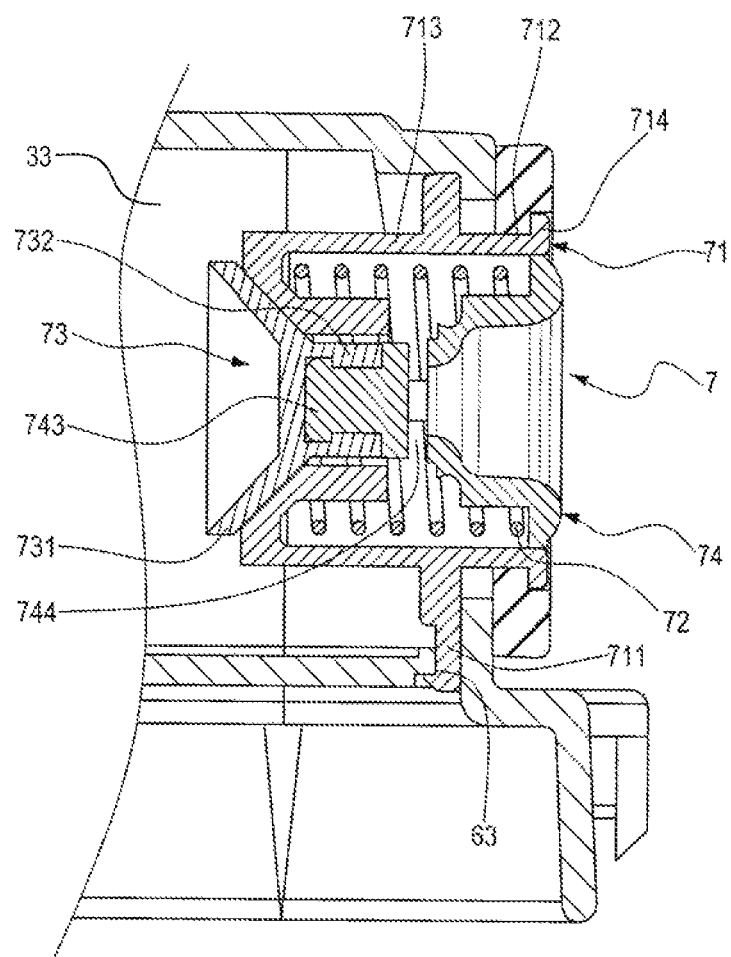
FIG. 4 is a schematic diagram of a cross-section of an air intake valve according to the invention.

In addition, with reference to FIG. 4, the partition 6 has a cavity 63. The air intake valve 7 has a plate hook portion 711, which corresponds to the cavity 63, so as to insert into the cavity 63. Accordingly, the air intake valve 7 is firmly fixed at the air intake 4 to prevent loosening.

Therefore, fresh air enters the air intake valve 7 disposed to the air intake 4 and flows through the drainage channel 33 defined by the partition 6 and the cover body 3 into the arc portion 31. The fresh air is then guided by the arc portion 31 into the box body 2 and pushes foul air originally in the box body 2 to exhaust it away from the air vent valve 8 disposed to the air vent 5, thereby circulating air in the box body 2.

In addition, the relative positions between the air intake 4 and the air intake valve 7 or the air vent 5 and the air vent valve 8 can be regulated so as to achieve a goal of circulating air in the box body 2 as well.

Figure 3:
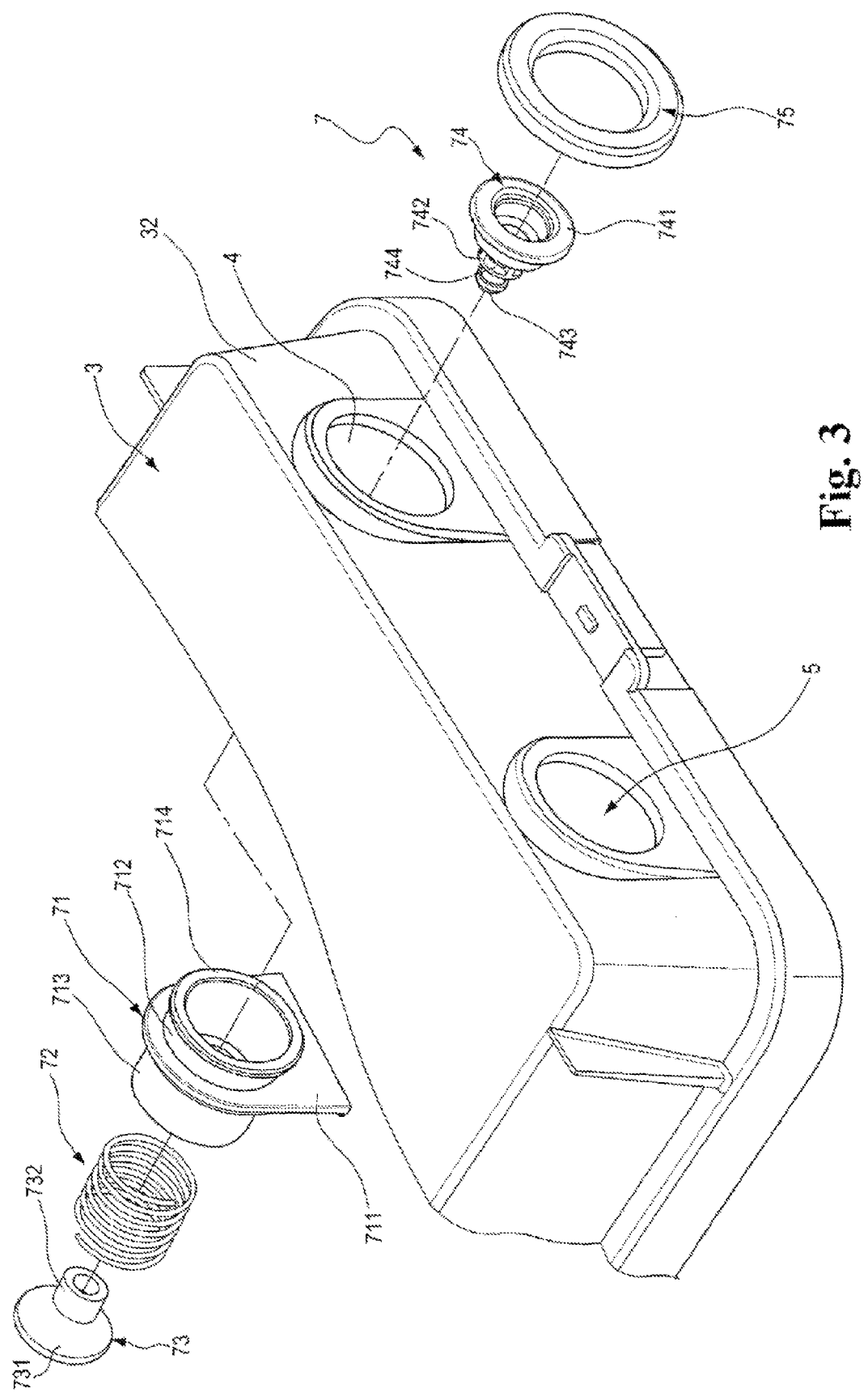
FIG. 3 is a schematic diagram of a decomposition of an air intake valve according to the invention.

With reference to FIG. 3 and FIG. 4, the air intake valve 7 has a base 71, a flexible member 72, a first valve plug 73, a plug member 74 and a sealing member 75. The base 71 is partially at an outside of the cover body 3 and partially at an inside of the cover body 3. The flexible member 72 and the first valve plug 73 are disposed in the cover body 3. The plug member 74 and the sealing member 75 are disposed to the outside of the cover body 3. The base 71 comprises a plate hook portion 711, a first circular portion 712 and a second circular portion 713. The first circular portion 712 is disposed to the plate hook portion 711 near a side of the rear end 32 of the cover body 3 and outwardly disposed with a circular flange 714. The first circular portion 712 passes through the air intake 4 and allows the circular flange 714 to expose to the outside of the cover body 3. The second circular portion 713 is disposed to the plate hook portion 711 that is distant from a side of the rear end 32 of the cover body 3. An inner diameter of the first circular portion 713 is larger than an inner diameter of the second circular portion 713. The first valve plug 73 is disposed in the second circular portion 713 and has a disc body 731 and a cylinder body 732. The cylinder body 732 is near the second circular portion 713. The flexible member 72 can be a compression spring, wherein two ends respectively lean against in the second circular portion 713 and the disc body 731 of the first valve plug 73. The cylinder body 732 is located in the flexible member 72. The plug member 74 has a head portion 741, an air guiding portion 742 and a connection portion 743. The head portion 741 is disposed to the air guiding portion 742 that is distant from a side of the base 71. The connection portion 743 is disposed to the air guiding portion 742 near a side of the base 71. The air guiding portion 742 is intervally disposed with a plurality of air guiding ports 744 at equivalent angles. The connection portion 743 is plugged into the cylinder body 732 of the first valve plug 73 through the base 71 and the flexible member 72. The sealing member 75 is fit to the circular flange 714 of the first circular portion 712.

Since the disc body 731 of the first valve plug 73 is closely attached to the second circular portion 713 to show a closed state.

Figure 5:
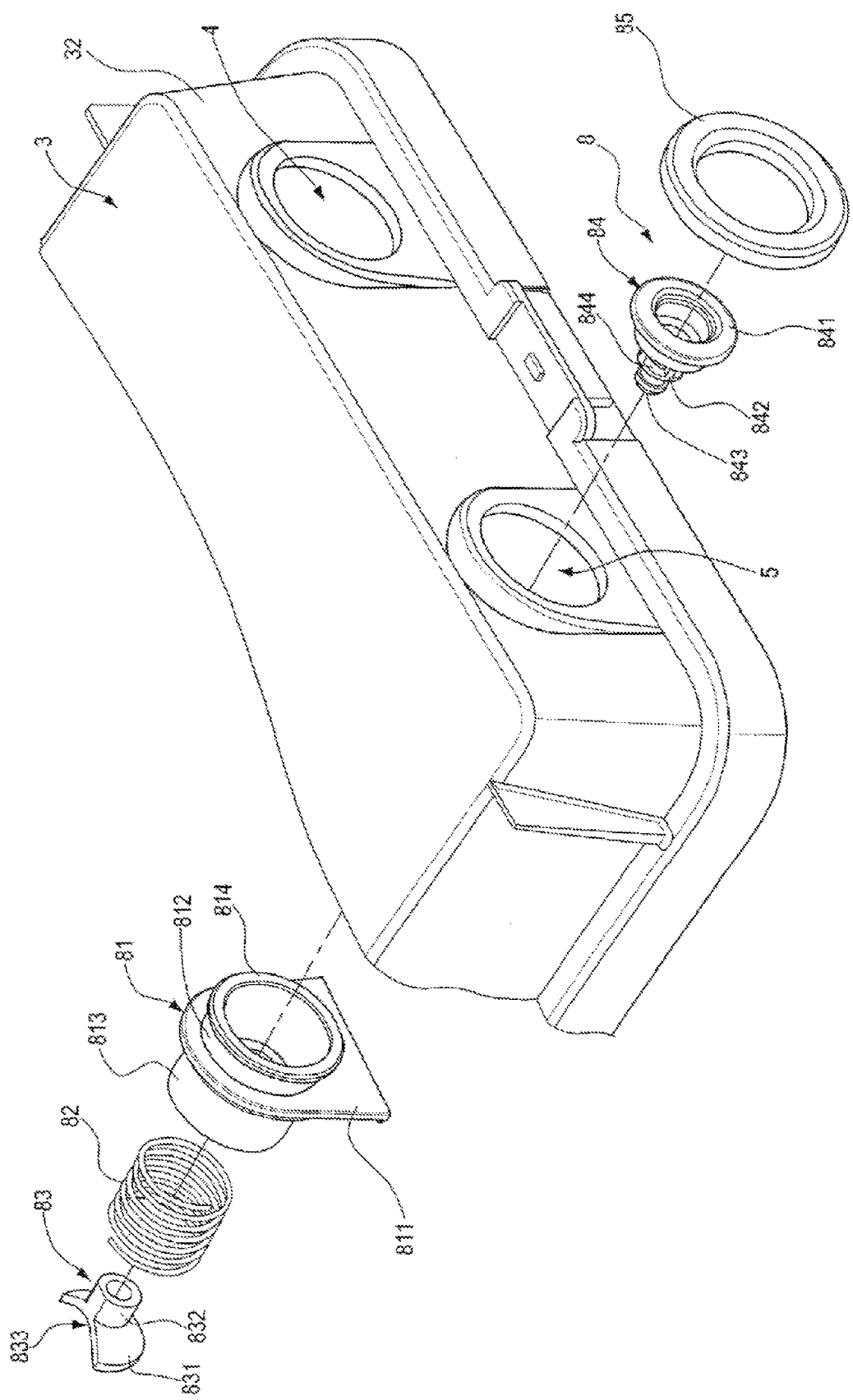
FIG. 5 is a schematic diagram of a decomposition of a decomposition of an air vent valve according to the invention.
Figure 6:
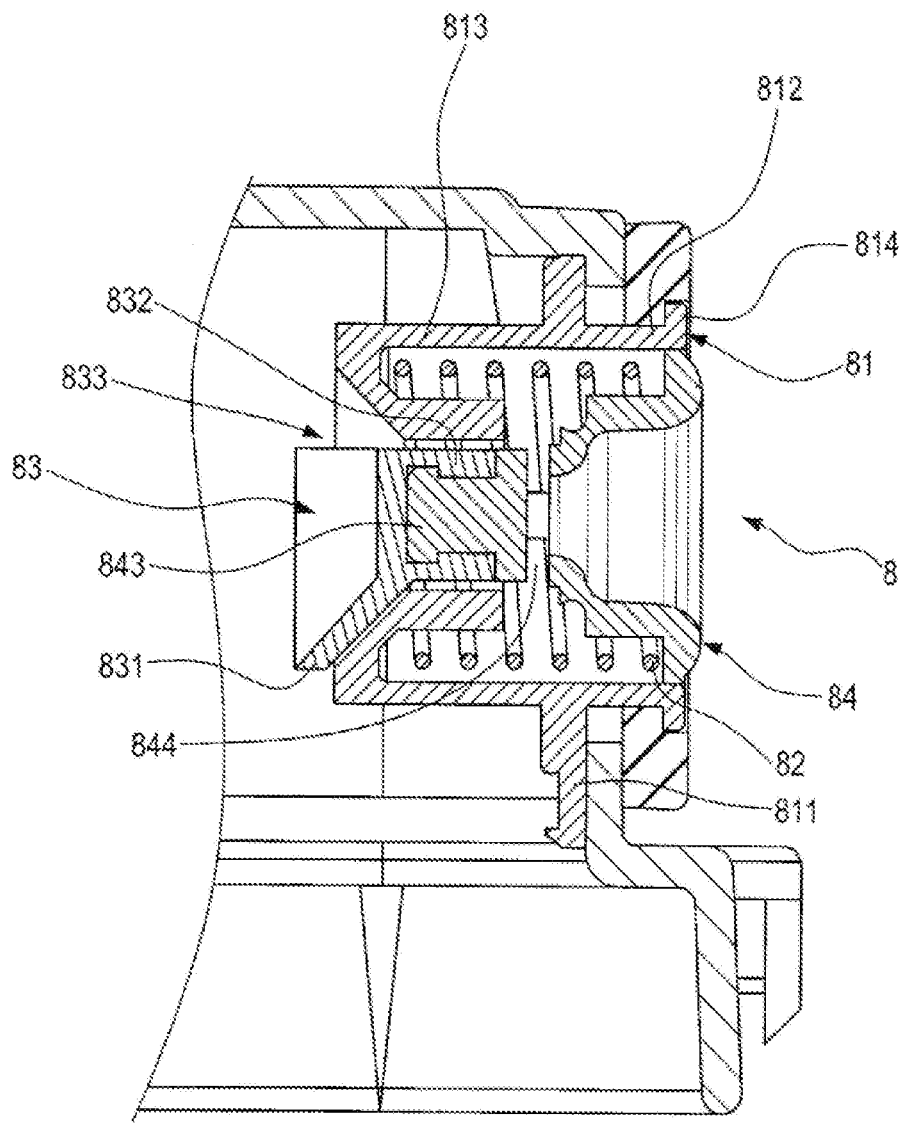
FIG. 6 is a schematic diagram of a cross-section of an air vent valve according to the invention.

As shown in FIG. 5 and FIG. 6, the structure of the air vent valve 7 is approximately similar to the structure of the air intake valve 7, and the difference is at the structure of the valve plug.

It should be noted that the air vent valve 8 has a base 81, a flexible member 82, a second valve plug 83, a plug member 84 and a sealing member 85. The base 81 is partially at an outside of the cover body 3 and partially inside of the cover body 3. The flexible member 82 and the second valve plug 83 are disposed in the cover body 3. The plug member 84 and the sealing member 85 are disposed at the outside of the cover body 3. The base 81 comprises a plate hook portion 811, a first circular portion 812 and a second circular portion 813. The first circular portion 812 is disposed to the plate hook portion 811 near a side of a rear end 32 of the cover body 3 and outwardly disposed with a circular flange 814. The first circular portion 812 passes through the air vent 5 and allows the circular flange 814 to expose to the outside of the cover body 3. The second circular portion 813 is disposed to the plate hook portion 711 that is distant from a side of the rear end 32 of the cover body 3. An inner diameter of the first circular portion 812 is larger than an inner diameter of the second circular portion 813. The second valve plug 83 is disposed in the second circular portion 813 and has a disc body 831 and a cylinder body 832. The cylinder body 832 is near the second circular portion 813. The disc body 831 has a gap 833. The flexible member 82 can be a compression spring, wherein two ends respectively lean against the second circular portion 813 and the disc body 831 of the second valve plug 83. The cylinder body 832 is located in the flexible member 82. The plug member 84 has a head portion 841, an air guiding portion 842 and a connection portion 843. The head portion 841 is disposed to the air guiding portion 842 that is distant from a side of the base 81. The connection portion 843 is disposed to the air guiding portion 842 near a side of the base 81. The air guiding portion 842 is intervally disposed with a plurality of air guiding ports 844 at equivalent angles. The connection portion 843 is plugged into the cylinder body 832 of the second valve plug 83 through the base 81 and the flexible member 82. The sealing member 85 is fit to the circular flange 814 of the first circular portion 812.

Although the disc body 831 of the second valve plug 83 is closely attached to the second circular portion 813, the disc body 831 of the second valve plug 83 has a gap 833 to show a micro-circulation state.

Figure 7:
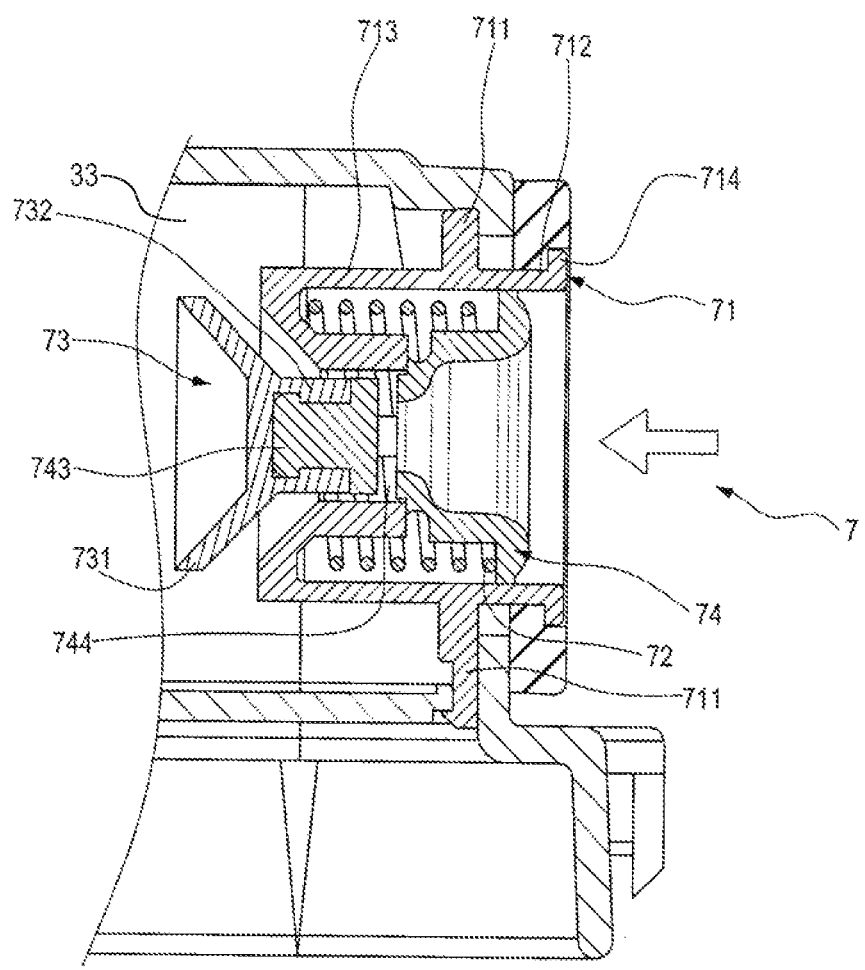
FIG. 7 is a schematic diagram of a movement of an air intake valve according to the invention.
Figure 8:
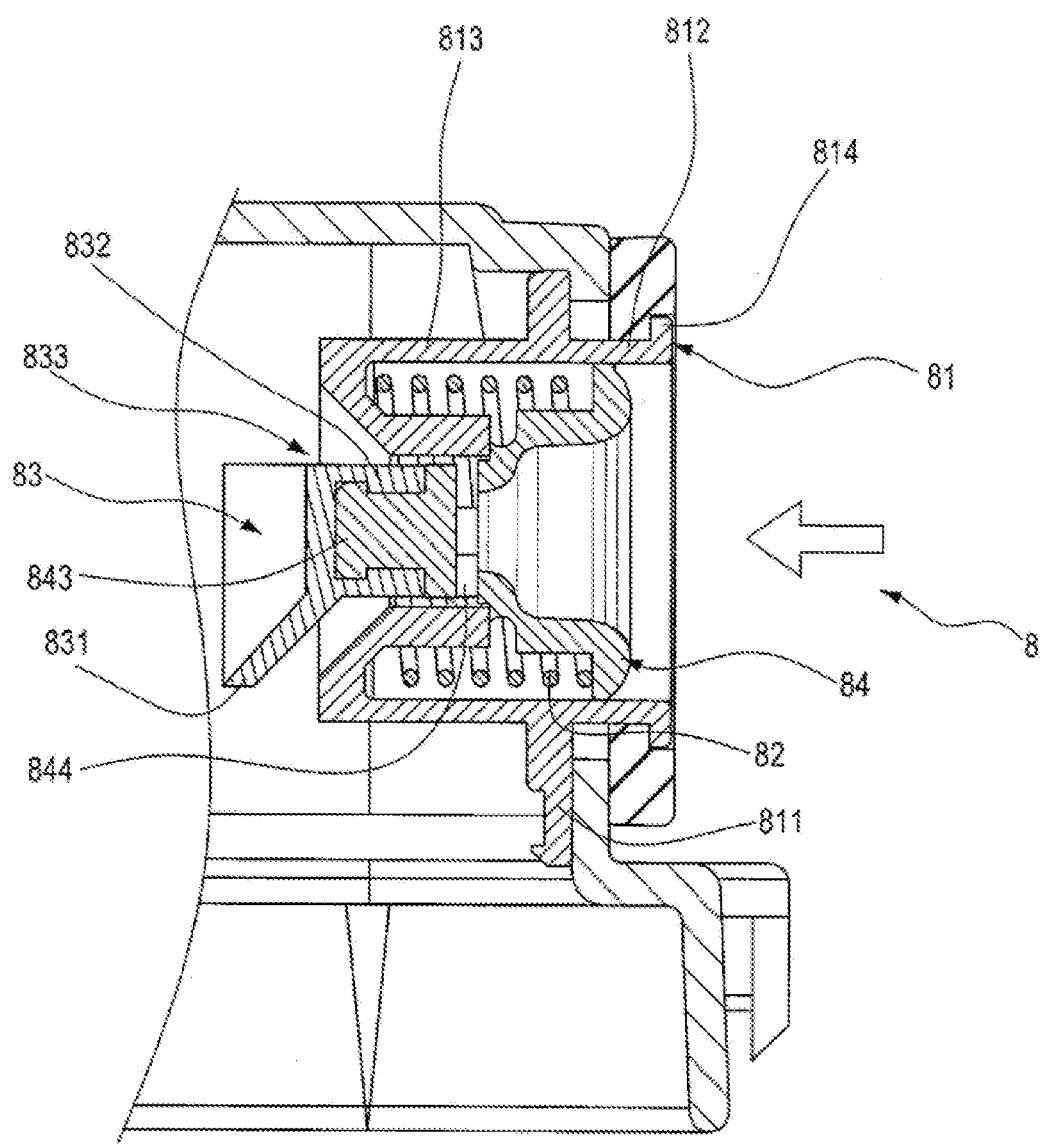
FIG. 8 is a schematic diagram of a movement of an air vent valve according to the invention.

With reference to FIG. 7 and FIG. 8, while introducing fresh air into the air intake valve 7 disposed to the air intake 4, as shown in FIG. 7, the plug member 74 must be downwardly pressed in advance to allow the disc body 731 of the first valve plug 73 to move off the second circular portion 713 of the base 71. The fresh air can enter from the center portion of the plug member 74 and passes through the interval between the disc body 731 and the second circular portion 713 via each air guiding port 742 and finally enters the cover body 3. It should be noted that the fresh air enters the drainage channel 33 defined by the partition 6 and the cover body 3 and is introduced in the box body 2 through the arc portion 31 of the cover body 3 to push the foul air originally in the box body 2.

Next, while exhausting foul air from the air vent valve 8 disposed to the air vent 5, as shown in FIG. 8, the plug member 84 is downwardly pressed to allow the disc body 831 of the second valve plug 83 to move off the second circular portion 813 of the base 81 so that foul air can flow from an interval between the disc body 831 and the second circular member 813 and then passes through the central portion of the plug member 84 via each air guiding port 842 to exhaust away.

With the foregoing structure, the fresh air can enter the drainage channel 33 defined by the cover body 3 and the partition 6 through the air intake valve 7 disposed to the air intake 4. Next, the fresh air is introduced to the arc portion 31 of the cover body 3 from the drainage channel 33. Since the length of the drainage channel 33 is larger than a half of the length of the cover body 3, the fresh air may not push or may not be mutually affected with foul air within the box body 2. When fresh air is introduced into the box body 2 from the arc portion 31, foul air originally in the box body 2 is exhausted from the air vent valve 8 disposed to the air vent 5, thereby exactly achieving an effect of circulating air.

Moreover, the filtering net 34 and the semi-opened air vent valve 8 can form micro-circulation. When the breeding cage 1 for experimental animals is taken out of the rack body of a breeding system of experimental animals, there is an air circulation effect in the breeding cage 1 for experimental animals to effectively prevent the experimental animals from being stifled.

The invention improves over the prior art and complies with patent application requirements, and thus is duly filed for patent application. While the invention has been described by device of specific embodiments, numerous modifications and variations could be made thereto by those generally skilled in the art without departing from the scope and spirit of the invention set forth in the claims.

What is claimed is:

1. A breeding cage for experimental animals composed of a box body and a cover body, wherein the cover body has a length and a plurality of sides and covers the box body, the cover body having an arc portion, the cover body further comprising:

an air intake disposed to a front of the cover body and toward one of the plurality sides, the air intake being inserted with an air intake valve;

an air vent disposed to the front of the cover body and separated from the air intake, the air vent being inserted with an air vent valve;

a partition located in the cover body extending toward the arc portion from the front of the cover body, the partition and the cover body defining a drainage channel, the drainage channel extending to the length of the cover body; and a vertical plate vertically connected to a horizontal plate for dividing the partition into an intake drainage channel and the drainage channel;

wherein the air intake valve comprises a base, a flexible member, a first valve plug, a plug member and a sealing member, and the base is partially at an outside of the cover body and partially in the cover body, and the flexible member and the first valve plug are disposed in the cover body, and the plug member and the sealing member are disposed to the outside of the cover body, and the base comprises a plate hook portion, a first circular portion and a second circular portion, and the first circular portion is disposed to the plate hook portion near a side of the rear end of the cover body and outwardly disposed with a circular flange, and the first circular portion passes through the air intake and allows the circular flange to expose to an outside of the cover body, and the second circular portion is disposed to the plate hook portion that is distant from a side of the front of the cover body, and an inner diameter of the first circular portion is larger than an inner diameter of the second circular portion, and the first valve plug is disposed in the second circular portion and has a disc body and a cylinder body, and the cylinder body is near the second circular portion, and two ends of the flexible member respectively lean against the second circular portion and the disc body of the first valve plug, and the cylinder body is located in the flexible member, and the plug member has a head portion, an air guiding portion and a connection portion, and the head portion is disposed to the air guiding portion that is distant from a side of the base, and the connection portion is disposed to the air guiding portion near a side of the base, and the air guiding portion is intervally disposed with a plurality of air guiding ports at equivalent angles, and the connection portion is plugged in the cylinder body of the first valve plug through the base and the flexible member, and the sealing member is fit to the circular flange of the first circular portion.

2. The breeding cage for experimental animals as recited in claim 1, wherein the cover body has a filtering net partially and rotably disposed to a place near the arc portion, and the filtering net has a replaceable filter.

3. The breeding cage for experimental animals as recited in claim 1, wherein the partition has a cavity, and the air intake valve has a plate hook portion corresponding to the cavity, and the plate hook portion is inserted into the cavity.

4. The breeding cage for experimental animals as recited in claim 1, wherein the air vent valve comprises a base, a flexible member, a second valve plug, a plug member and a sealing member, and the base is partially at an outside of the cover body and partially in the cover body, and the flexible member and the second valve plug are disposed in the cover body, and the plug member and the sealing member are disposed to the outside of the cover body, and the base comprises a plate hook portion, a first circular portion and a second circular portion, and the first circular portion is disposed to the plate hook portion near a side of the front end of the cover body and outwardly disposed with a circular flange, and the first circular portion passes through the air vent and allows the circular flange to expose to an outside of the cover body, and the second circular portion is disposed to the plate hook portion that is distant from a side of the front of the cover body, and an inner diameter of the first circular portion is larger than an inner diameter of the second circular portion, and the second valve plug is disposed in the second circular portion and has a disc body and a cylinder body, and the cylinder body is near the second circular portion, and two ends of the flexible member respectively lean against the second circular portion and the disc body of the second valve plug, and the cylinder body is located in the flexible member, and the plug member has a head portion, an air guiding portion and a connection portion, and the head portion is disposed to the air guiding portion that is distant from a side of the base, and the connection portion is disposed to the air guiding portion near a side of the base, and the air guiding portion is intervally disposed with a plurality of air guiding ports at equivalent angles, and the connection portion is plugged in the cylinder body of the second valve plug through the base and the flexible member, and the sealing member is fit to the circular flange of the first circular portion, and the disc body of the second valve plug has a gap.

5. The breeding cage for experimental animals as recited in claim 1, wherein a length of the drainage channel is longer than a half of the length of the cover body.

* * * * *